US009547928B2

(12) United States Patent
Hoerentrup

(10) Patent No.: US 9,547,928 B2
(45) Date of Patent: Jan. 17, 2017

(54) METHOD AND APPARATUS FOR AUTHORING STEREOSCOPIC 3D VIDEO INFORMATION, AND METHOD AND APPARATUS FOR DISPLAYING SUCH STEREOSCOPIC 3D VIDEO INFORMATION

(75) Inventor: Jobst Hoerentrup, Wennigsen (DE)

(73) Assignee: THOMSON LICENSING, Issy les Moulineaux (FR)

( * ) Notice: Subject to any disclaimer, the term of this patent is extended or adjusted under 35 U.S.C. 154(b) by 518 days.

(21) Appl. No.: 14/001,701

(22) PCT Filed: Feb. 17, 2012

(86) PCT No.: PCT/EP2012/052791
§ 371 (c)(1), (2), (4) Date: Aug. 27, 2013

(87) PCT Pub. No.: WO2012/116900
PCT Pub. Date: Sep. 7, 2012

(65) Prior Publication Data

US 2013/0335412 A1 Dec. 19, 2013

(30) Foreign Application Priority Data

Mar. 1, 2011 (EP) ..................................... 11305218

(51) Int. Cl.
*G06T 15/00* (2011.01)
*H04N 13/00* (2006.01)
(Continued)

(52) U.S. Cl.
CPC ............. *G06T 15/00* (2013.01); *H04N 13/004* (2013.01); *H04N 13/007* (2013.01);
(Continued)

(58) Field of Classification Search
None
See application file for complete search history.

(56) References Cited

U.S. PATENT DOCUMENTS

2009/0096863 A1 4/2009 Kim et al.
2009/0142041 A1 6/2009 Nagasawa et al.
(Continued)

FOREIGN PATENT DOCUMENTS

EP 2282550 A1 2/2011
JP 2010505174 2/2010
(Continued)

OTHER PUBLICATIONS

Kim, Donghyun, and Kwanghoon Sohn. "Depth adjustment for stereoscopic image using visual fatigue prediction and depth-based view synthesis." Multimedia and Expo (ICME), 2010 IEEE International Conference on. IEEE, 2010.*
(Continued)

*Primary Examiner* — Zhengxi Liu

(57) ABSTRACT

A method and an apparatus for authoring stereoscopic 3D video information comprising a 3D video stream and 3D overlay graphics are described. A depth range in z-space for the stereoscopic presentation of the 3D video stream is determined for a plurality of time codes. A reference plane in z-space for placing the 3D overlay graphics is then determined such that depth conflicts between the 3D video and the reference place are reduced. A comfort zone surrounding a display screen plane and comprising the reference plane is defined, wherein the comfort zone specifies a depth range in z-space for preferable presentation of the stereoscopic 3D video information. It is then determined whether a depth conflict between the reference plane and the 3D video stream remains for the respective time codes and/or whether a depth conflict exists between the comfort zone and the 3D overlay graphics for the respective time codes. In this way a set of conflict intervals is generated, which is stored on a media source comprising the 3D video stream and the 3D overlay graphics. The set of conflict intervals is used during playback to adapt a presentation of
(Continued)

the 3D video stream or a presentation of the 3D overlay graphics.

7 Claims, 3 Drawing Sheets

(51) Int. Cl.
*H04N 13/02* (2006.01)
*H04N 13/04* (2006.01)

(52) U.S. Cl.
CPC ..... *H04N 13/0033* (2013.01); *H04N 13/0066* (2013.01); *H04N 13/0292* (2013.01); *H04N 13/0456* (2013.01); *H04N 2213/002* (2013.01)

(56) References Cited

U.S. PATENT DOCUMENTS

2010/0074594 A1 3/2010 Nakamura et al.
2010/0091012 A1 4/2010 Newton et al.
2010/0241649 A1* 9/2010 Lewak ............. G06F 17/30997 707/767
2011/0227911 A1* 9/2011 Joo ..................... H04N 13/004 345/419
2012/0120200 A1* 5/2012 Newton ............ H04N 13/0003 348/46
2013/0010062 A1* 1/2013 Redmann .............. H04N 5/278 348/43

FOREIGN PATENT DOCUMENTS

KR 2004018859 3/2004
KR 20060134309 12/2006
KR 2009077515 7/2009
WO WO2009083863 7/2009
WO WO2010064118 6/2010
WO WO2010096281 8/2010

OTHER PUBLICATIONS

Anonymous, "Bankslab", http://web.archive.org/web/20051118112744/http://bankslab.berkeley.edu, Nov. 18, 2005, 1 page.
Anonymous, "Alpha Compositing", http://web.archive.org/web/20110223040246/http://en.wikipedia.org/wiki/Alpha_compositing, Feb. 23, 2011, pp. 1-6.
Anonymous, "HbbTV" http://web.archive.org/web/20110224120941/http://hbbtv.org, Feb. 24, 2011, pp. 1-4.

* cited by examiner

METHOD AND APPARATUS FOR AUTHORING STEREOSCOPIC 3D VIDEO INFORMATION, AND METHOD AND APPARATUS FOR DISPLAYING SUCH STEREOSCOPIC 3D VIDEO INFORMATION

This application claims the benefit, under 35 U.S.C. §365 of International Application PCT/EP2012/052791, filed Feb. 17, 2012, which was published in accordance with PCT Article 21(2) on Sep. 7, 2012 in English and which claims the benefit of European patent application No. 11305218.7, filed Mar. 1, 2011.

FIELD OF THE INVENTION

The invention relates to a method and an apparatus for authoring stereoscopic 3D video information comprising a 3D video stream and 3D overlay graphics. Further, the invention relates to a method and an apparatus for displaying such stereoscopic 3D video information.

BACKGROUND

With the recent box office success of stereoscopic 3D movies, it is desired to bring 3D video to home entertainment, too. One of the first solutions available is the Blu-ray 3D format. Preferably, the 3D movie is displayed inside a so-called comfort zone. Determination of the comfort zone is still an area of active research. Typically, the comfort zone describes an interval in z-space extending from somewhere behind the screen to a minimal distance to a viewer in front of the screen. One option for determination of this comfort zone is the so-called ⅓ diopter rule. Further, the range of the comfort zone according to the ⅓ diopter rule depends on the distance between the viewer or user and the screen. Reproduction of 3D elements outside the comfort zone should be limited to special scenes and should be done with care to avoid user discomfort.

The Blu-ray 3D format not only supports stereoscopic 3D video, it also supports stereoscopic 3D auxiliary information such as stereoscopic 3D interactive applications like a user menu, which are preferably written in the Java programming language.

An interactive menu may allow the user to select a certain scene, a different audio track, etc. Further, 3D subtitles or an information text may be added to the stereoscopic reproduction. Such information, which is typically presented in front of a main video stream, shall be referred to as overlay graphics.

One technical challenge so as to provide a pleasant 3D user experience is to coordinate visual non-video elements, i.e. overlay graphics such as the aforementioned interactive menus, with the main video stream in z-space. In general, so called depth conflicts should be avoided and overlay graphics should be placed in front of the 3D main video stream. Preferably, interactive graphics should be placed in front of the subtitles if possible. A depth conflict between e.g. a main video stream and a user menu occurs if at least parts of both elements take the same place in z-space. In such a conflicting area the user's viewing experience may be unpleasant.

Document WO 2009/083863 A1 discloses a method for display of 3D overlay graphics that are presented in front of a 3D main video stream. In order to prevent occlusions due to depth conflicts the available depth range in z-space is split up into separate sub ranges. A respective sub range in z-space is reserved for overlay data, the main video stream, subtitles, etc.

SUMMARY

It is an object of the invention to provide a method for displaying stereoscopic 3D video information comprising a 3D video stream and 3D overlay graphics, a reproduction device and a system for displaying the stereoscopic 3D video information comprising the reproduction device and a media source allowing a more comfortable and flexible reproduction of the 3D video information.

According to a first aspect of the invention, a method for displaying stereoscopic 3D video information comprising a 3D video stream and 3D overlay graphics comprises the steps of:

a) retrieving a set of conflict intervals associated to the 3D video stream from a media source comprising the 3D video stream and the 3D overlay graphics, wherein the set of conflict intervals is provided together with the stereoscopic 3D video information, and wherein a conflict interval indicates that for certain time codes of the 3D video stream a depth conflict between the 3D video stream and a reference plane of the 3D overlay graphics or a depth conflict between the 3D overlay graphics and a comfort zone defined in the authoring process exists, and b) adapting a presentation of the 3D video stream or a presentation of the 3D overlay graphics for time codes of the 3D video stream that are located in one of the conflict intervals so as to resolve the corresponding depth conflict.

In order to implement the method according to the invention, a reproduction device for displaying stereoscopic 3D video information comprising a 3D video stream and 3D overlay graphics is configured to:

a) retrieve a set of conflict intervals associated to the 3D video stream from a media source comprising the 3D video stream and the 3D overlay graphics, wherein the set of conflict intervals is provided together with the stereoscopic 3D video information, and wherein a conflict interval indicates that for certain time codes of the 3D video stream a depth conflict between the 3D video stream and a reference plane of the 3D overlay graphics or a depth conflict between the 3D overlay graphics and a comfort zone defined in the authoring process exists, and b) adapt a presentation of the 3D video stream or a presentation of the 3D overlay graphics for time codes of the 3D video stream that are located in one of the conflict intervals so as to resolve the corresponding depth conflict.

According to the invention, a set of conflict intervals is handed over to a reproduction device. A depth conflict exists between the 3D overlay graphics and the reference plane if the depth in z-space for any feature of the 3D video stream conflicts with the reference plane in z-space. Similarly, a depth conflict exists between the 3D overlay graphics and the comfort zone if the depth in z-space for any feature of the 3D overlay graphics is outside the comfort zone. The reproduction of the 3D video stream or the 3D overlay graphics is adapted for time codes of the 3D video stream that are located in one of the conflict intervals so as to resolve the depth conflict between presentation of the 3D video stream and the reference plane. The solution according to the invention thus avoids fixed depth spaces for presentation of either the 3D video stream or the 3D overlay graphics. Instead of this static solution, reproduction of either the main video stream or the overlay graphics is adapted in order to prevent user discomfort. Advantageously, depth conflicts are avoided on a per-frame basis or in predetermined time intervals by simply checking the set of conflict intervals.

Preferably, the set of conflict intervals is retrieved from a media source comprising the 3D video stream and the 3D overlay graphics. For this purpose the media source comprises a set of conflict intervals in addition to a 3D video stream and 3D overlay graphics. The set of conflict intervals indicates those intervals for which a depth conflict exists between the 3D video stream and a reference plane of the 3D overlay graphics or between the 3D overlay graphics and a comfort zone. Advantageously, the set of conflict intervals is determined and stored on the media source during authoring of the 3D video stream and the 3D overlay graphics.

Advantageously, the step of adapting the presentation of the 3D overlay graphics comprises determining a shifted reference plane that is different from an initial reference plane for a conflict interval, wherein a position in z-space for the shifted reference plane is selected such that the depth conflict is resolved. In this way occlusions and artifacts are be avoided since the overlay graphics is placed in front of the 3D video stream. Preferably, the reference plane is shifted back to its initial position if the video depth information indicates that the depth of the three-dimensional presentation of the main video stream does no longer exceed the reference plane. Further preferably, the respective conflict interval is eliminated from the set of conflict intervals.

Favorably, the step of adapting the presentation of the 3D overlay graphics comprises varying a z-space expansion of the 3D overlay graphics such that the depth conflict between the 3D overlay graphics and the comfort zone is resolved. By dynamically adjusting the depth of the 3D overlay data the best user experience is safeguarded. On the one hand the user enjoys a 3D presentation of overlay data and on the other hand the comfort zone is not exceeded and a comfortable viewing experience is guaranteed.

Alternatively, the step of adapting the presentation of the 3D overlay graphics comprises switching a presentation mode for the 3D overlay graphics or for the 3D video stream from a stereoscopic 3D mode to a flat 2D mode. By switching the presentation mode from the preferred 3D mode to a 2D or flat presentation mode, depth conflicts between the 3D overlay graphics and the 3D video stream may be avoided. In case the presentation mode for the 3D video stream is switched to a 2D or flat presentation mode, the 3D effect of the main video stream is sacrificed for a period of time. However, this may be acceptable since the primary user focus will likely be on the 3D overlay graphics rather than on the video stream. Preferably, the presentation mode is switched back to 3D presentation at a later runtime of the video stream. This is performed if the respective conflict interval indicates that the 3D presentation of the video stream does no longer exceed the reference plane or violates the comfort zone. Advantageously, the 3D video effect is sacrificed only as long as necessary, i.e. for a minimum time. The user enjoys 3D presentation of the main video stream as well as 3D presentation of the overlay graphics as long as possible.

According to another aspect of the invention, the step of adapting the presentation of the 3D overlay graphics comprises adapting a transparency value for at least a part of the 3D overlay graphics. Preferably, the transparency value is adapted for a part of the 3D overlay graphics which causes the depth conflict. Advantageously, at least the conflicting parts of the overlay graphics are more transparent or even invisible so as to not disturb the presentation of the video stream.

Favorably, the step of adapting the presentation of the 3D overlay graphics comprises delaying a user request for presentation of 3D overlay data until the end of the conflict interval. Often, user menus are organized in so-called pop-up menus that are activated due to a user command. In the particular case, the user tries to open such a menu and preferably a graphical indicator such as a sand glass or the like indicates that the respective menu will open after a short period of time. Consequently, the full depth of the main video stream as well as a reasonable depth for the 3D menu are possible, because at the later runtime of the video stream there will not occur any depth conflict.

According to another aspect of the invention, a method for authoring stereoscopic 3D video information comprising a 3D video stream and 3D overlay graphics comprises the steps of:

a) determining a depth range in z-space for the stereoscopic presentation of the 3D video stream for a plurality of time codes, b) determining a reference plane in z-space for placing the 3D overlay graphics such that depth conflicts between the 3D video and the reference plane are reduced, c) defining a comfort zone surrounding a display screen plane and comprising the reference plane, wherein the comfort zone specifies a depth range in z-space for preferable presentation of the stereoscopic 3D video information, d) determining whether a depth conflict between the reference plane and the 3D video stream remains for the respective time codes and/or whether a depth conflict exists between the comfort zone and the 3D overlay graphics for the respective time codes, e) determining a set of conflict intervals defined by the respective time codes for which a depth conflict remains between the reference plane and the 3D video stream and/or for which a depth conflict exists between the comfort zone and the 3D overlay graphics, and f) storing the set of conflict intervals on a media source comprising the 3D video stream and the 3D overlay graphics.

Similarly, an apparatus for authoring stereoscopic 3D video information comprising a 3D video stream and 3D overlay graphics is configured to:

a) determine a depth range in z-space for the stereoscopic presentation of the 3D video stream for a plurality of time codes, b) determine a reference plane in z-space for placing the 3D overlay graphics such that depth conflicts between the 3D video and the reference plane are reduced, c) define a comfort zone surrounding a display screen plane and comprising the reference plane, wherein the comfort zone specifies a depth range in z-space for preferable presentation of the stereoscopic 3D video information, d) determine whether a depth conflict between the reference plane and the 3D video stream remains for the respective time codes and/or whether a depth conflict exists between the comfort zone and the 3D overlay graphics for the respective time codes, e) determine a set of conflict intervals defined by the respective time codes for which a depth conflict remains between the reference plane and the 3D video stream and/or for which a depth conflict exists between the comfort zone and the 3D overlay graphics, and f) store the set of conflict intervals on a media source comprising the 3D video stream and the 3D overlay graphics.

In a first step a depth range in z-space for stereoscopic presentation of the 3D video stream is determined for a plurality of time codes. Determination of the depth range may be performed by disparity estimation from a stereo pair of images or can be derived from the 3-dimensional virtual environment in case of computer generated content. Then a reference plane is set to a certain point in z-space. The 3D overlay graphics are presented in a depth interval in z-space ranging from the reference plane to an upper threshold facing a viewer. The reference plane is set in such way that depth conflicts between the 3D video and the reference plane are avoided to a certain extent. In addition, a comfort zone surrounding a display screen plane and comprising the reference plane is defined. The comfort zone defines a depth range in z-space for preferable presentation of the stereoscopic 3D video information. Subsequently the remaining depth conflicts between the reference plane and the 3D video stream are determined, wherein a depth conflict exists between the 3D overlay graphics and the reference plane if the depth in z-space for any feature of the 3D video stream conflicts with the reference plane in z-space. Alternatively or in addition depth conflicts between the comfort zone and the 3D overlay graphics are determined, wherein a depth conflict exists between the comfort zone and the 3D overlay graphics if any feature of the 3D overlay graphics conflicts in z-space with an upper threshold of the comfort zone facing a viewer. The determined conflict intervals are added to a set of conflict intervals.

BRIEF DESCRIPTION OF DRAWINGS

Further aspects of the invention will ensue from the following description of an example embodiment of the invention with reference to the accompanying drawings, wherein.

DETAILED DESCRIPTION OF AN EXEMPLARY EMBODIMENT

Figure 1:
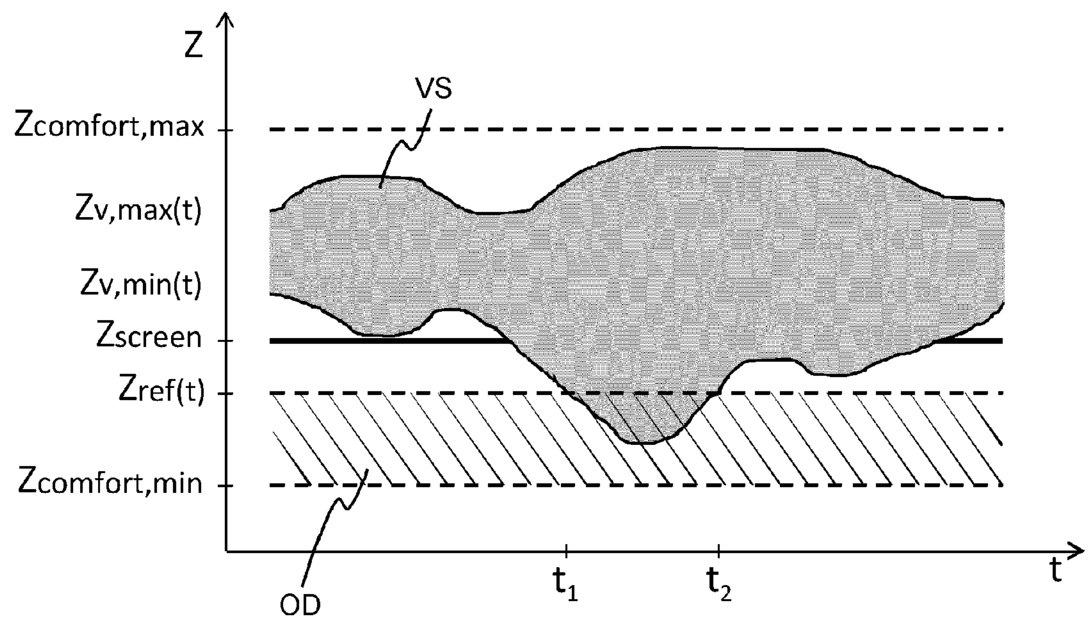
FIG. 1 is a graph indicating how a depth of a stereoscopic 3D video stream varies over time and a depth conflict between reproduction of the main 3D video stream and 3D overlay graphics arises.

FIG. 1 is a plot illustrating a depth Z of a stereoscopic 3D main video stream VS over time t. Further, the depth of the presentation range of overlay graphics OD is illustrated by the hashed area. While the minimum depth value Zv,min(t) and the maximum depth value Zv,max(t) of the video stream VS vary over time, the depth range for presentation of the overlay graphics OD is constant over time. The depth range for presentation of the overlay graphics OD starts at the depth Zref, which indicates a depth value in z-space of a reference plane, and ends at the minimum value of a comfort zone Zcomfort,min. In general, reproduction of video information is preferably located around the depth of the screen Zscreen. Preferably, the 3D video information is located inside a comfort zone that is defined by its minimum depth Zcomfort,min and its maximum depth Zcomfort,max in z-space.

The comfort zone takes the aspect of a pleasant 3D viewing experience into account. Boundaries of the comfort zone in z-space may be empirical values. Another option is a definition of the comfort zone by help of the ⅓ diopter rule and a reference viewing environment. This aims to limit the convergence-accommodation conflict. The comfort zone describes an interval in z-space around a position of the screen Zscreen, i.e. the user's 3D TV. It extends from somewhere behind the screen to somewhere in front of the screen. The comfort zone further depends on the distance between the user and the screen. Placement of 3D elements outside the comfort zone should be limited and be done with care to avoid user discomfort.

While for a period of time before $t_1$, the video stream VS and the overlay graphics OD may be presented both within the available comfort zone, at $t_1$ a depth conflict arises. Such a depth conflict may lead to user discomfort. At a later time $t_2$, the depth of the main video stream VS steps back behind the depth of the reference plane Zref and the depth conflict is resolved. However, within the time span $t_1$-$t_2$ the user may have an unpleasant viewing experience. Further, as illustrated in FIG. 1, for most of the time the overlay graphics OD is positioned closer to the viewer than necessary. In other words, there is z-space left between the minimum distance Zv,min(t) of the video stream VS and the depth of the reference plane Zref. In stereo 3D presentation, there is a desire to position non-video graphical elements as close as possible to the screen plane to minimize so-called ghosting artifacts. From a technical point of view these are crosstalk effects between the left and right channel.

Figure 2:
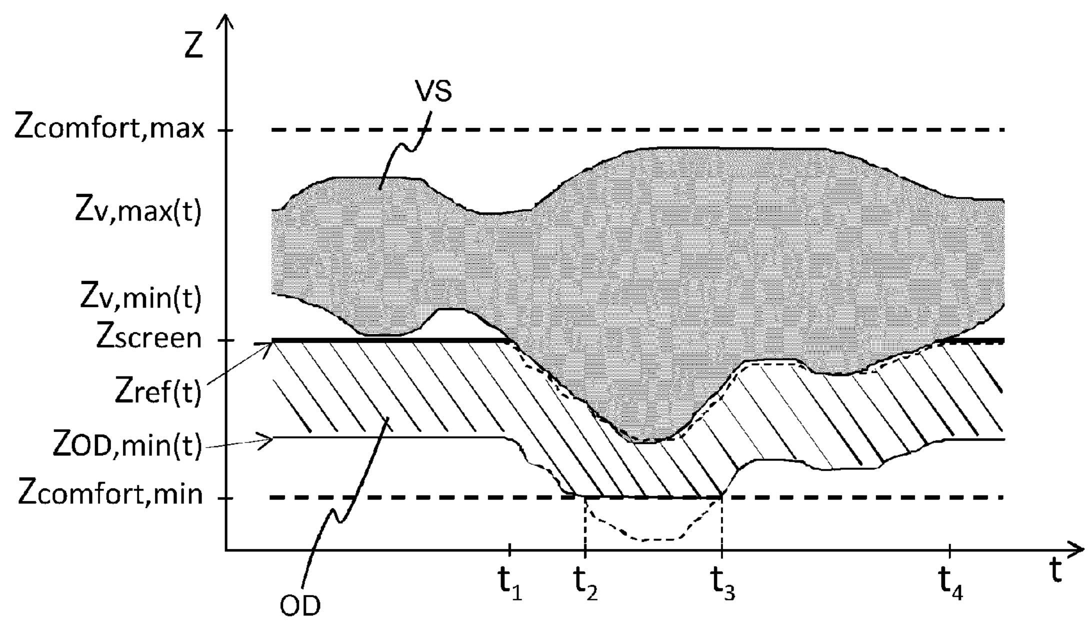
FIG. 2 illustrates adaption of a position in z-space of a reference plane and a reduction of a depth range for presentation of overlay graphics.

FIG. 2 illustrates a time-dependent positioning of the reference plane Zref(t). Again, the figure shows the depth range of the main video stream VS and the overlay graphics OD as a time depended value. The reference plane Zref is positioned nearer to the depth of the screen Zscreen, preferably it is identical. This has the advantage that it reduces the ghosting effect and is further preferable with respect to the vergence accommodation conflict. Finally, this allows extending the z-volume for presentation of the 3D overlay graphics. However, at $t_1$, a depth conflict between the overlay graphics OD and the stereoscopic 3D main video stream VS occurs.

The z-space position Zref(t) of the reference plane is variable over time and is adapted to the depth of the reproduction of the video stream VS as it is indicated between $t_1$ and $t_4$ by the dashed line following the minimum distance Zv,min(t) of the main video stream VS. The adaption of the reference plane Zref is preferably performed on a per-frame basis, e.g. during authoring. However, it may likewise be performed on the fly during reproduction. In this case the frequency and accuracy of the corresponding adaption of the depth range for the overlay graphics OD may vary for different systems. In real-time-capable systems, updates may be possible on a per-frame basis, leading to the best user experience. However, in case interactive applications must be implemented on a non-real-time Java platform, the depth adjustments may not be perfectly synchronized to the video frames. Also computational power of the consumer equipment embedded processes may be limited. In such cases, depth updates may not be possible for each frame of the main video stream and may not be accurate with respect to timing. However, even with a lower than a per-frame update frequency and possibly timing-imperfect adjustments, the user experience will still be significantly better than without any adjustments. Further, the programmer/author can foresee a safety margin between the position of the reference plane Zref(t) and the minimum depth of the main video stream Zv,min(t) to take into account that the update of the reference plane Zref(t) is not done on a per-frame basis.

In FIG. 2, between $t_1$ and $t_2$ the reference plane Zref(t) is shifted to avoid depth conflicts between the main video stream VS and the overlay data OD. However, at $t_2$ the minimum depth of the overlay data ZOD,min(t) is in conflict with the minimum depth of the comfort zone Zcomfort,min. In order to not exceed the comfort zone, the depth range for the presentation of the overlay graphics is reduced to the available depth between the reference plane Zref(t) and the minimum depth of the comfort zone Zcomfort,min. Accordingly, between $t_2$ and $t_3$, the depth range for presentation of the overlay graphics OD is flattened to a lower depth, while at $t_3$ the depth conflict between the presentation of the overlay graphics OD and the minimum comfort zone Zcomfort,min is resolved and the overlay graphics can return to its original depth. At $t_4$, the depth of the main video stream VS steps back behind the reference plane Zref(t) and the presentation of the overlay graphics OD returns to its original depth.

For dynamic depth adjustments, the necessary data can be retrieved in various ways by the respective application or by a respective reproduction device for playback of stereoscopic 3D video information. The media time, i.e. the runtime or time codes of the main video, is usually retrievable through an application programming interface (API). The position of the reference plane in z-space may also be retrievable via an API at application runtime or may be provided to the application through a data file. A list of conflict intervals may be handed over to a reproduction unit. For a certain runtime of the main video stream, if e.g. the user requests presentation of a 3D menu, the reproduction device checks the list of conflict intervals. If a depth conflict has to be avoided, suitable countermeasures are performed.

Figure 3:
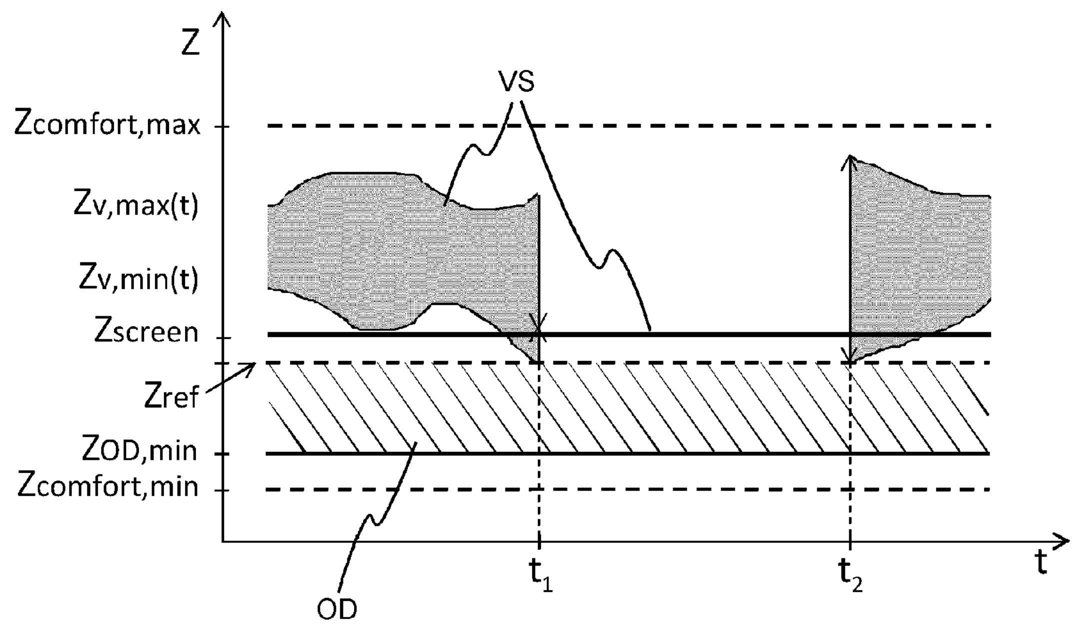
FIG. 3 shows a further embodiment, according to which the presentation of the main video stream is switched from a 3D mode to a 2D mode.

FIG. 3 illustrates another embodiment of the invention. The starting scenario is comparable to that of FIG. 1, i.e. the reference plane Zref and the depth range for the presentation of the overlay data OD are constant. Before $t_1$, no depth conflict between presentation of the video stream VS and the overlay data OD occurs. However, during a certain period of time between $t_1$ and $t_2$ there will be a depth conflict. To avoid this, the video stream VS is shown as a flat (2D) video only. If the depth information of the main video stream VS, i.e. the list of conflict intervals, indicates that present depth conflict interval is over, which is the case at $t_2$, the presentation mode is switched back to 3D mode. Of course, it is likewise possible to switch the presentation mode for the overlay graphics OD to the flat 2D mode. For this purpose the reproduction device preferably offers an API to the respective application to switch its presentation mode. Apparently, between $t_1$ and $t_2$ the position of the reference plane Zref may be chosen freely between the depth of the screen Zscreen and the minimum depth of the comfort zone Zcomfort,min, e.g. by choice of the content author. Preferably, it is constant over time and set close to the depth of the screen Zscreen. Preferably, $t_1$ and $t_2$ are defined to be the time for which Zv,min(t) equals Zref(t). However, $t_1$ can also be chosen smaller and $t_2$ can be chosen greater.

The embodiment according to FIG. 3 has the advantage that it is easy to realize, because the position of the reference plane Zref in z-space does not need to be updated. No adjustments of the interactive application's 3D depth are necessary.

Figure 4:
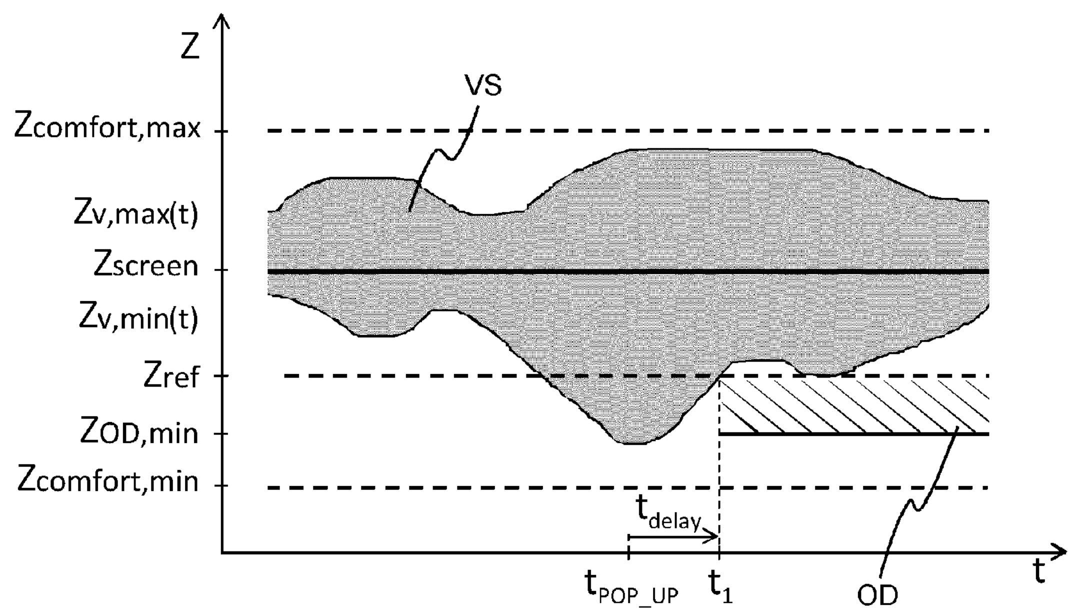
FIG. 4 illustrates another embodiment of the invention, wherein the reproduction of 3D overlay graphics is delayed due to a depth conflict.

FIG. 4 is an illustration of a further embodiment of the invention, where the overlay graphics OD is a so-called pop-up menu. Triggered by a user's action at the time $t_{pop\_up}$—the video stream VS is still playing in 3D mode—a pop-up menu is expected to open. However, as apparent from FIG. 4, this would cause a depth conflict between the main video stream VS and the overlay graphics OD. According to the embodiment, the user command is delayed for a time $t_{delay}$ during which the user may be shown a graphical indicator, a sand glass or the like, to indicate the pending user command. This delay time expires at a time $t_1$, when the depth conflict is resolved. In other words, the delay time $t_{delay}$ is chosen large enough so as to prevent a depth conflict. At the end of the conflict interval the pop-up menu is presented in 3D.

Figure 5:
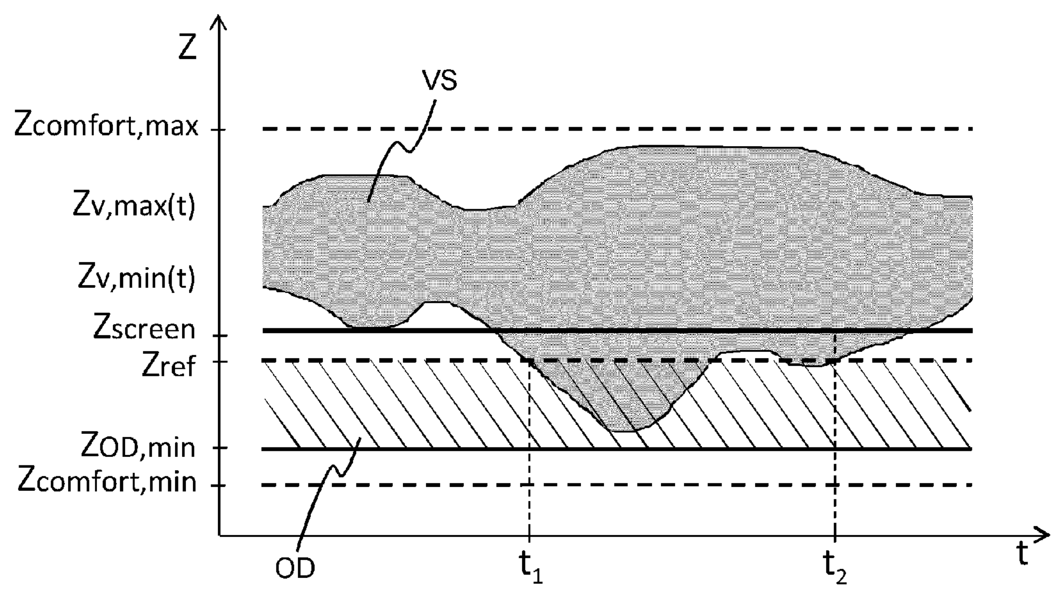
FIG. 5 illustrates the reproduction of the main 3D video stream and overlay graphics in a time dependent graph, wherein a depth conflict is resolved by varying a transparency value of the overlay graphics.
Figure 6:
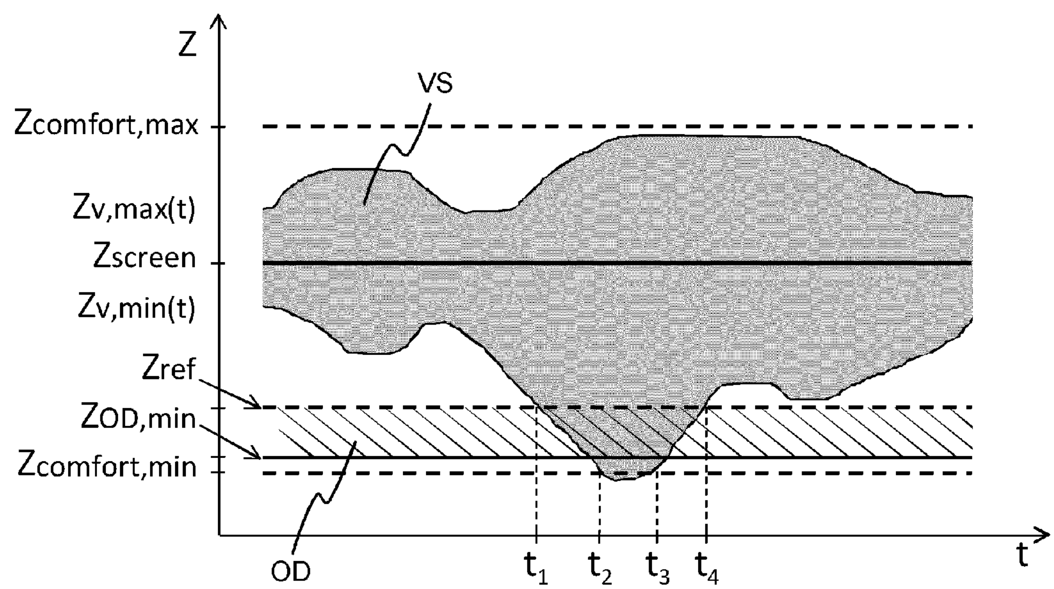
FIG. 6 illustrates the reproduction of the main 3D video stream and overlay graphics in a time dependent graph in case of an exceptional depth conflict.

According to another aspect of the invention, two further embodiments are described by making reference to FIGS. 5 and 6. FIG. 5 shows a scenario similar to FIGS. 1 and 2. Between $t_1$ and $t_2$ a depth conflict between the main video stream VS and the overlay graphics OD is present. To resolve this depth conflict, at least a part of the overlay graphics is made transparent. Preferably, solely the respective parts or pixels of the overlay graphics causing the depth conflict with the main video stream are transparent. In FIG. 5, this is illustrated by the intersection between the area for VS (between $t_1$ and $t_2$) and the hashed area indicating the presentation of the overlay graphics OD. Preferably, the overlay graphics or a part of it is set fully transparent in order to not disturb the visibility of the main video stream VS. In other words, the overlay data vanishes in part or completely. Presentation of the main video stream VS has priority. Alternatively, instead of rendering the overlay graphics information OD in a fully transparent manner, it may be decided to completely remove the respective parts of the 3D graphical output.

According to FIG. 6, between $t_1$ and $t_4$, there is a conflict between the presentation of the main video stream VS and the presentation of the overlay graphics OD. Between $t_2$ and $t_3$ an exceptional conflict occurs. The main video stream VS, e.g. due to a desired special effect, infringes the minimum depth of the comfort zone Zcomfort,min. Accordingly, there is no space left at all for presentation of the overlay graphics OD. Accordingly, the depth of the presentation of the overlay graphics OD may be reduced to a flat 2D presentation, preferably located at the minimum depth of the comfort Zcomfort,min. Alternatively, the overlay graphics OD may be transparent in the respective time interval.

Although the invention has been described hereinabove with reference to a specific embodiment, it is not limited to this embodiment and no doubt further alternatives will occur to the skilled person that lie within the scope of the invention as claimed.

The invention claimed is:

1. A method for displaying stereoscopic 3D video information comprising a 3D video stream and 3D overlay graphics, the method comprising:

retrieving a set of depth conflict intervals associated with the 3D video stream from a media source comprising the 3D video stream and the 3D overlay graphics, wherein the set of depth conflict intervals is provided together with the stereoscopic 3D video information, and wherein a depth conflict interval indicates a time span during which a minimum depth value of the 3D video stream falls within a depth range provided for presentation of the 3D overlay graphics, or during which the minimum depth value of the 3D video stream or a minimum depth value of the depth range provided for presentation of the 3D overlay graphics falls outside a comfort zone defined in an authoring process, wherein the comfort zone specifies a depth range in z-space for preferable presentation of the stereoscopic 3D video information, said time span being comprised between a first time and a second time, said first time and said second time are defined to be a time for which the minimum depth value of the 3D video stream equals a depth value of a reference plane of the 3D overlay graphics; and adapting a presentation of the 3D video stream or a presentation of the 3D overlay graphics for time codes of the 3D video stream that are located in one of the time spans indicated by the depth conflict intervals so as to resolve the corresponding depth conflict.

2. The method according to claim 1, wherein the adapting the presentation of the 3D overlay graphics comprises varying a z-space expansion of the 3D overlay graphics.

3. The method according to claim 1, wherein the adapting the presentation of the 3D overlay graphics comprises switching a presentation mode for the 3D overlay graphics or for the 3D video stream from a stereoscopic 3D mode to a flat 2D mode.

4. The method according to claim 1, wherein the adapting the presentation of the 3D overlay graphics comprises adapting a transparency value for at least a part of the 3D overlay graphics.

5. The method according to claim 4, wherein the transparency value is adapted for a part of the 3D overlay graphics causing the depth conflict.

6. The method according to claim 1, wherein the adapting the presentation of the 3D overlay graphics comprises delaying a user request for presentation of 3D overlay data until the end of the depth conflict interval.

7. A method for authoring stereoscopic 3D video information comprising a 3D video stream and 3D overlay graphics, the method comprising:

determining a depth range in z-space for the stereoscopic presentation of the 3D video stream for a plurality of time codes;

determining a depth range in z-space for placing the 3D overlay graphics;

defining a comfort zone surrounding a display screen plane, wherein the comfort zone specifies a depth range in z-space for preferable presentation of the stereoscopic 3D video information;

determining time spans during which a minimum depth value of the 3D video stream falls within the depth range provided for presentation of the 3D overlay graphics, or during which the minimum depth value of the 3D video stream or a minimum depth value of the depth range provided for presentation of the 3D overlay graphics falls outside the comfort zone, said time span being comprised between a first time and a second time, said first time and said second time are defined to be a time for which the minimum depth value of the 3D video stream equals a depth value of a reference plane of the 3D overlay graphics;

determining a set of depth conflict intervals indicating the determined time spans; and storing the set of depth conflict intervals on a media source comprising the 3D video stream and the 3D overlay graphics.

* * * * *